United States Patent
Pandey et al.

(10) Patent No.: US 10,075,259 B2
(45) Date of Patent: Sep. 11, 2018

(54) SYSTEMS AND METHODS OF TIME SLOT ALLOCATION FOR SHARED MESH PROTECTION ON BUNDLED LINKS

(71) Applicant: Infinera Corporation, Annapolis Junction, MD (US)

(72) Inventors: Saurabh Pandey, Bangalore (IN); Saratchandar Adayapalam Viswanathan, Bangalore (IN); Vinay Khana, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/094,632

(22) Filed: Apr. 8, 2016

(65) Prior Publication Data
US 2017/0195080 A1     Jul. 6, 2017

Related U.S. Application Data

(60) Provisional application No. 62/275,736, filed on Jan. 6, 2016.

(51) Int. Cl.
    *H04J 14/08*         (2006.01)
    *H04B 10/032*     (2013.01)

(52) U.S. Cl.
    CPC ............ *H04J 14/08* (2013.01); *H04B 10/032* (2013.01)

(58) Field of Classification Search
    CPC .............................. H04B 10/032; H04J 14/08
    See application file for complete search history.

(56) References Cited

U.S. PATENT DOCUMENTS

| | | | | |
|---|---|---|---|---|
| 2003/0189925 A1* | 10/2003 | Wellbaum | ............. | H04J 3/0623 370/372 |
| 2004/0202467 A1* | 10/2004 | Luft | .................... | H04B 10/032 398/4 |
| 2005/0198524 A1* | 9/2005 | Benvenuti | ................ | H04J 3/14 726/22 |
| 2014/0126899 A1* | 5/2014 | Prakash | ............... | H04B 10/032 398/5 |

\* cited by examiner

*Primary Examiner* — David Payne
*Assistant Examiner* — Omar S Ismail
(74) *Attorney, Agent, or Firm* — Tyler Brown; David L. Soltz

(57) ABSTRACT

Systems and methods for time slot allocation of time slots for bundled links in a shared mesh GMPLS for protect paths with different of COS may include time slot allocation divided into multiple phases with each phase having some qualification criterion to go to next phase or exit if the criterion is not met. For example, allocation of time slots for a circuit may include three phases—component selection phase, a connection admission phase, and an optimization phase.

20 Claims, 8 Drawing Sheets

| Connection (max TS=100) | Provisioned WorkTs | PhysicalProv ProtTs | SubscribedProv ProtTs | FreeTs |
|---|---|---|---|---|
| C1 | 10 | 40 | 80 | 50 |
| C2 | 50 | 20 | 40 | 30 |
| C3 | 20 | 20 | 20 | 60 |
| C4 | 10 | 10 | 40 | 80 |
| C5 | 10 | 10 | 20 | 80 |

FIG. 5

SYSTEMS AND METHODS OF TIME SLOT ALLOCATION FOR SHARED MESH PROTECTION ON BUNDLED LINKS

CLAIM OF PRIORITY UNDER 35 U.S.C. § 119

The present application for patent claims priority to Provisional Application No. 62/275,736 entitled "Method of Resource Allocation for Shared Mesh Protection on Bundled Links" filed Jan. 6, 2016, and assigned to the assignee hereof and hereby expressly incorporated by reference herein.

FIELD OF DISCLOSURE

This disclosure relates generally to optical communication networks and more specifically, but not exclusively, to time slot allocation for optical communication networks.

BACKGROUND

Multiprotocol label switching (MPLS) is a scheme in high-performance telecommunication networks which directs and carries data from one node to the next node. The multiprotocol label switching mechanism assigns labels to data packets. Packet forwarding decisions from one node to the next node are made solely on the contents of the label for each data packet, without the need to examine the data packet itself.

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial multiplexing (e.g. incoming port or fiber to outgoing port or fiber). Multiplexing, such as time-division multiplexing is when 2 or more signals or bit streams are transferred simultaneously. In particular, time-division multiplexing (TDM) is a type of digital multiplexing in which 2 or more signals or bit streams are transferred simultaneously as sub-channels in one communication channel, but are physically taking turns on the communication channel. The time domain is divided into several recurrent time slots (TS) of fixed length, one for each sub-channel. After the last sub-channel, the cycle starts all over again. Time-division multiplexing is commonly used for circuit mode communication with a fixed number of channels and constant bandwidth per channel. Time-division multiplexing differs from statistical multiplexing, such as packet switching, in that the time slots are returned in a fixed order and pre-allocated to the channels, rather than scheduled on a packet by packet basis.

Generalized Multiprotocol Label Switching includes protection and recovery mechanisms which specifies predefined (1) working connections within a shared mesh network having multiple nodes and communication links for transmitting data between the nodes; and (2) protecting connections specifying a different group of nodes and/or communication links for transmitting data in the event that one or more of the working connections fail. In other words, when a working connection fails, the Generalized Multiprotocol Label Switching protocol automatically activates one of the protecting connections into a working connection for redirecting data within the shared mesh network.

However, the protection and recovery mechanisms defined in GMPLS have overlooked a number of issues when scaling to large optical shared mesh networks. Shared mesh protection (SMP) is a common protection and recovery mechanism in transport network, where multiple protect circuits can share the same set of time slots for protection purposes. In SMP, one work circuit is protected by one or many protect circuits. And these protect circuits from different work can share the time slots on network links. Depending on network planning requirements, user may identify the set of network links which can be used to provisioned protect circuit.

In shared mesh protection, each protecting connection is likely established over a set of time slots that are shared by multiple other connections. Upon the detection of working connection failure, the head end nodes may trigger the activation of the protecting connections, and redirect user traffic immediately after. The time slot assignment in a link is still a part of the control-plane Connection Admission Control (CAC) operation taking place on each shared protection node. The time slot assignment and sharing method among different protect circuits on the shared links is one of most important aspect of SMP. Thus, there is a constant pressure to maximize the sharing in the network by optimally utilizing the time slots.

This creates complexities and challenges in time slot sharing on a network link among multiple protect circuits from different work circuit. For example, the protect circuit in the network can be created in any order and each protect circuit may be protecting a set of network failures, or Shared Risk Link Group (SRLG) in the network, from the work circuit path. A number of provisioned protect circuit in a link creates a foot print of protected SRLGs. For a new protect path time slot allocation request, there may be a number of options available in terms of time slot on the link to choose from the current foot print by sharing with them. This problem becomes severe when the network link is bundled, i.e., consists of a number of component links. In a bundled link, the allocation has to be such that it avoids the spray of protection circuits among the component links, i.e., select the TS in a way to avoid fragmentation of Bandwidth (BW) among components. In addition, a service provider/network operator may want to define different protection criterion and sharing requirements for different services. This brings the need of having different class of services (COS) of different protect circuits, e.g., high priority (HP) and Low priority (LP). The system must be able to provide such service differentiation.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: determining, by a controller, an amount of unused time slots available for each of a plurality of connections connecting a first device to a second device, each of the plurality of connections carrying optical signals formatted as a plurality of time slots, the plurality of time slots constituting a time division multiplexed transmission and wherein the controller comprises a memory and a logic circuit configured to communicate with the first device, the second device, a third device, and a fourth device; determining, by the controller, if any of the plurality of time slots of the plurality of connections are being used as a first work circuit connecting the third device and the fourth device or reserved for use as a first protect circuit connecting the third device and the fourth device; sorting, by the controller, the plurality of connections based on an amount of used time slots of a respective one of the plurality of connections; and assigning, by the controller, at least one of the unused time slots of each of the plurality of connections to a time division multiplexed circuit connecting the first device to the second device.

In another aspect, an apparatus including: a controller comprising a memory and a logic circuit configured to communicate with a first device, a second device, a third device, and a fourth device and further configured to: determine an amount of unused time slots available for each of a plurality of connections connecting the first device to the second device, each of the plurality of connections carrying optical signals formatted as a plurality of time slots, the plurality of time slots constituting a time division multiplexed transmission; determine if any of the plurality of time slots of the plurality of connections are being used as a first work circuit connecting the third device and the fourth device or reserved for use as a first protect circuit connecting the third device and the fourth device; sort the plurality of connections based on an amount of used time slots of a respective one of the plurality of connections; and assign at least one of the unused time slots of each of the plurality of connections to a time division multiplexed circuit connecting the first device to the second device.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 5 illustrates an exemplary distribution of time slot across connections in a Bundled Connection in accordance with some examples of the disclosure.

Figure 1A:
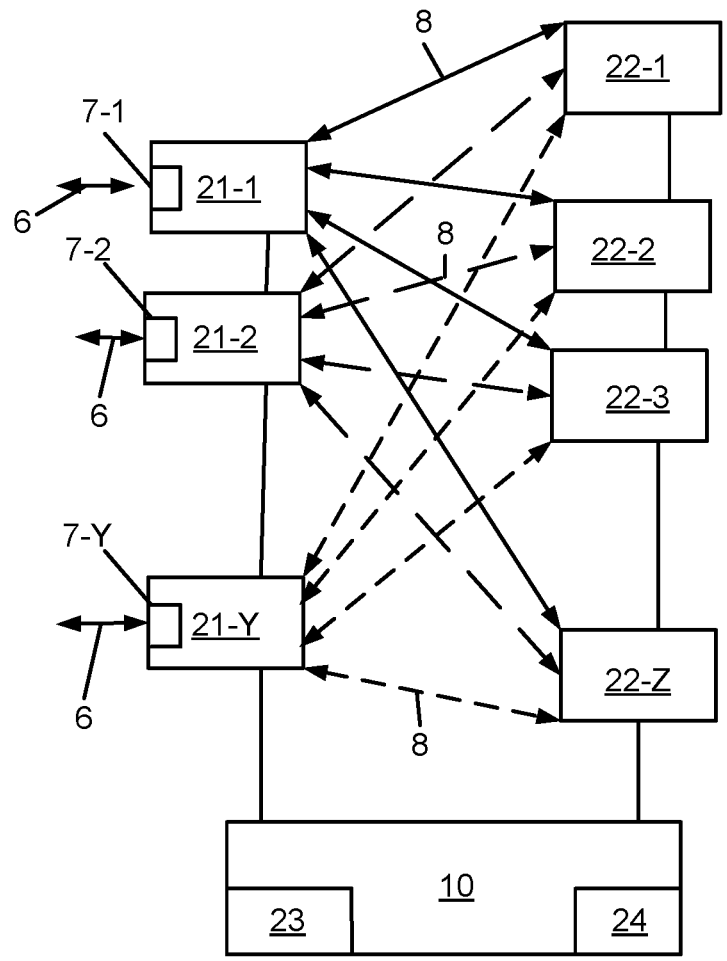
FIG. 1A illustrates an exemplary node of a network in accordance with some examples of the disclosure. in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, one exemplary system may be configured to provide time slot allocation (provision a new circuit in a network) in a three step process—(1) Component Selection Phase, (2) Connection Admission Phase, and (3) Optimization Phase. In the first step, a determination is made of which connections in a network have available time slots. In the second step, a determination is made of which of the available time slots are suitable for the new circuit. In the third step, a set of optimal time slots from the suitable time slots is selected and the new circuit provisioned using these optimal time slots. Available time slots may be determined based on which time slots are unused by any circuit or used only by a protect circuit. Suitable time slots may be determined based on which available time slots satisfy the rate requirement of the new circuit as well as the over or under subscription of those particular time slots. The set of optimal time slots may be chosen based on which set provides a maximum bandwidth usage and allows for multiple failure scenarios.

FIG. 1A is a diagram of exemplary components of node 12. As shown in FIG. 1A, node 12 may include a controller 10 configurable to control the operation of the node 12 including connection admission (e.g. a software defined networking controller capable of connection admission control), line cards or modules 21-1, 21-2, . . . , 21-Y (referred to collectively as "line modules 21," and individually as "line module 21") (where Y>=1) connected to switching planes 22-1, 22-2, . . . 22-Z (referred to collectively as "switching planes 22," and individually as "switching plane 22") (where Z≥1). Controller 10 may be an application, such as in a SDN, that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may include a logic circuit and a memory configured to uses protocols such as OpenFlow to configure network devices and choose the optimal network path (e.g. first path 460 or second path 470) for application traffic. In effect, the controller 10 may be configured to serve as a sort of operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consists of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 1A shows a particular number and arrangement of components, node 12 may include additional, fewer, different, or differently arranged components than those illustrated in FIG. 1A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Line module 21 may include hardware components such as one or more ports 7-1, 7-2, ... , 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 1A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 1B:
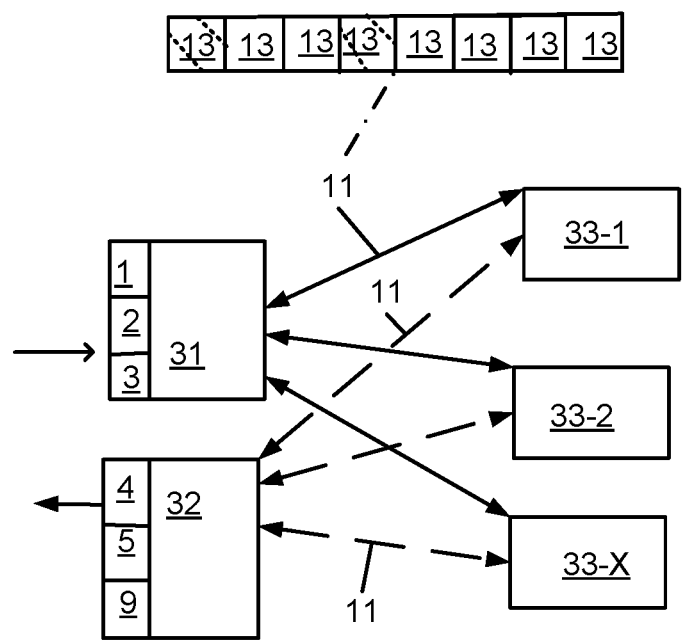
FIG. 1B illustrates an exemplary line module of the node in FIG. 1A in accordance with some examples of the disclosure.

FIG. 1B is a diagram of exemplary components of a line module 21. As shown in FIG. 1B, line module 21 may include a receiver (RX) photonic integrated circuit (PIC) 31 (e.g. a port 7-1), a transmitter (TX) PIC 32 (e.g. a port 7-2), and fabric managers (FMs) 33-1, 33-2, ... , 33-X (referred to collectively as "FMs 33," and individually as "FM 33") (where X≥1). While FIG. 1B shows a particular number and arrangement of components, line module 21 may include additional, fewer, different, or differently arranged components than those illustrated in FIG. 1B. Also, it may be possible for one of the components of line module 21 to perform a function that is described as being performed by another one of the components.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 1B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 1C:
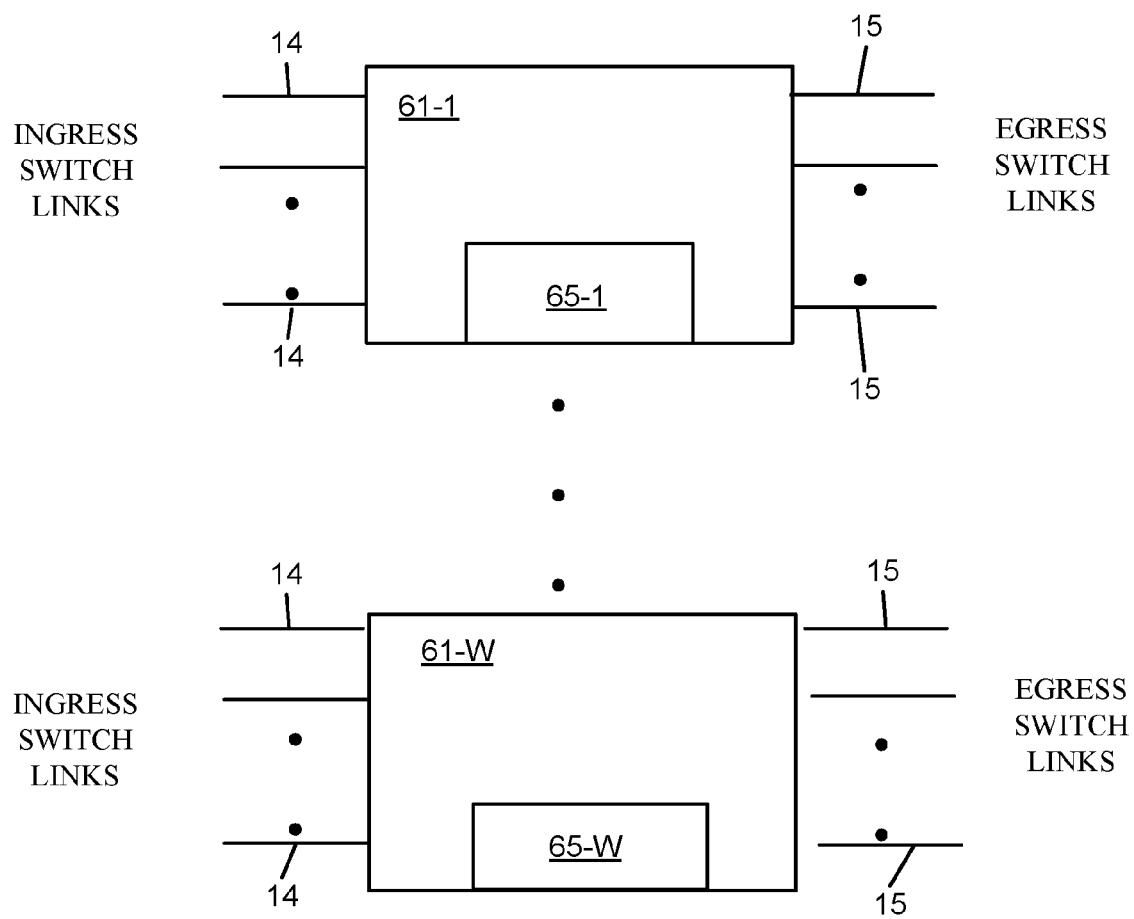
FIG. 1C illustrates an exemplary switch of the node in FIG. 1A in accordance with some examples of the disclosure.

FIG. 1C is a diagram of exemplary components of a switching plane 22. As shown in FIG. 1C, switching plane 22 may include switches 61-1, ... , 61-W (referred to collectively as "switches 61," and individually as "switch 61") (where W≥1). While FIG. 1C shows a particular number and arrangement of components, switching plane 22 may include additional, fewer, different, or differently arranged components than those illustrated in FIG. 1C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
| --- | --- | --- | --- |
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 1D:
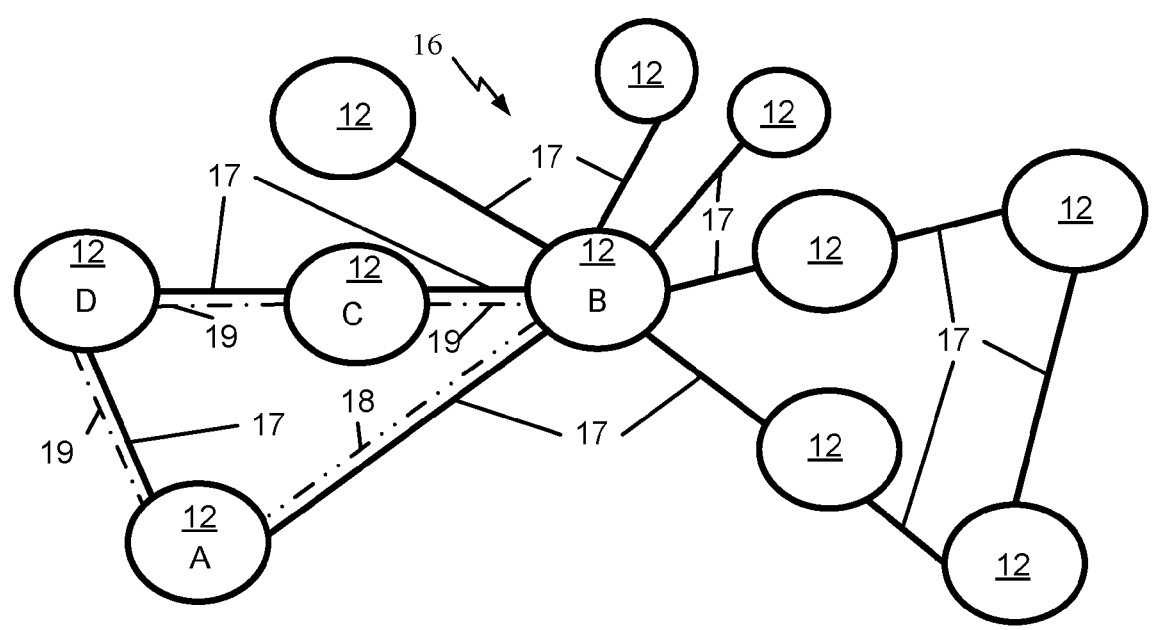
FIG. 1D illustrates an exemplary network configuration of the nodes in FIG. 1A in accordance with some examples of the disclosure.

FIG. 1D illustrates an exemplary network configuration of the nodes in FIG. 1A in accordance with some examples of the disclosure. As shown in FIG. 1D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a uni-directional or bi-direction medium such as an optical fiber capable of transporting an optical signal 6 or an electrical signal 11. The following examples describe apparatus and methods for use in conjunction with node 12.

First, an explanation of some different concepts used in the following examples. Oversubscription and Oversubscription limit: On a network connection 17, how many times a TS 13 on a connection 17, is shared by multiple protect paths (i.e. a plurality of connections 17 connecting a first node 12 to a second node 12 etc. that is configured for use as a protection circuit that provides a backup plurality of connections 17 for a primary or work path/circuit) defines the oversubscription of the time slot. Since one service can take a TS 13 only once, this indicates how many protect paths are created on a particular TS 13. A limit on how many times can a time slot on a connection 17 be shared/subscribed may be called OversubscriptionLimit. Herein a path and a circuit are used interchangeably. For example, a protect path may be the same as a protect circuit and a work path may be the same as a work circuit 18. FIG. 1D shows one example of a work circuit/path 18 that connects a first device A with a second device B over the connection 17 between the first device A and the second device B that uses at least one time slot 13 of a first stream of signals 6 transmitted between the device A and the device B along with a protect circuit/path 19 that connects the first device A to the second device B using a different plurality of connections 17 as shown and at least one time slot 13 of a second stream of signals 6 transmitted between the first device A to a fourth device D then a third device C and then to the second device B. Alternatively, the work circuit 18 may use the connections 17 shown for the protect circuit 19 and the protect circuit 19 may use the connection 17 shown for the work circuit 18. While only one work circuit 18 and one protect circuit 19 are shown, it should be understood that network 16 may include more than one and the work circuit 18 may have more than one protect circuit 19.

Protected risk identification or SRLG identification: A protect circuit 19, provisioned on a TS 13, may tell which connection 17 of the work circuit 18 it is protecting or in other terms the failure in which work connection 17 will use this protect circuit 19*t*. This is called protected risk by the protect circuit 19. This may be an SRLG in the network, i.e., network elements, network connection 17, fiber, conduit etc. A set of protect circuits 19 provisioned on a TS 13 will identify the set of network risks or SRLGs protected by this TS 13. While SRLG may be used as the parameter to identify the network failure, it may be any other identifier in the network 16.

Class of service (COS) for protect paths: Two class of protect services are identified—High priority (HP) and Low priority (LP). Any time slot 13 of the protect circuit 19 may be configured as a HP protect circuit 19 or a LP protect circuit 19. The network operator may differentiate protection requirements between different COS. As an example, all premium customer services can be HP protect circuits 19 and low cost customer circuits can be LP circuits 19. LP circuits may also be given protection by sharing a time slot 13 with HP circuits. LP protect circuit may take the time slot 13 when it is not used by other HP protect circuits. However, the HP, when required, would preempt the LP circuit and take the time slot 13.

One exemplary method for time slot allocation is divided in to multiple phases with each phase having some qualification criterion to go to next phase or exit if the criterion is not met. In order to provision connections 17 in a traffic engineering (TE) connection 17.

There are certain considerations for provisioning connections 17 in a TE Connection 17, such as those mentioned below. For example, a Connection Admission Control (CAC) module 20 (e.g. of controller 10) may be included in the TDM capable node 12 that performs the provisioning for a bundled TE Connection 17. A bundled TE Connection 17 consists of a set of component TE Connections 17, i.e., $B=\Sigma C_M$, where M is the number of connections. Each connection has a set of TS 13 or BW. The aggregated BW for all the connections 17 constitutes the Bandwidth of the bundled TE Connection 17. Each bundled TE Connection 17 has an SRLG associated with it in the network 16. The failure of that bundled TE Connection 17 is identified by the failure of SRLG or vice-versa in the network 16. For simplicity, the disclosure will describe or consider one SRLG associated with one bundled TE Connection 17.

For each work circuit 18 there will be a set of Protect Circuits 19, a set here could be {1 ... N}. A work circuit 18 comprises one or more connections 17 in the network 16 (work circuit path). All these connections 17 in the work circuit path 18 will form a set of SRLGs on the work connections 17, failure of which can fail the work circuit traffic. This set is called WorkSrlg. Each protect circuit 19 identifies the SRLG failures (i.e. connections 17, node failure), of the work circuit path 18 it is protecting. This is called ProtectedSrlgList. This list may either contain all or subset of WorkSrlg of the work circuits 18.

Each bundled TE Connection 17 can admit work circuits 18 as well as protect circuits 19. And all the BW is available to either work circuits 18 as well as protect circuits 19 based on first come first serve basis. The TS 13 used by work circuits 18 are not shareable with any other work or protect circuit 19. The TS 13 used by protect circuits 19 can be shared by other protect circuits 19 given that both the protect circuits 19 do not have common items in ProtectedSrlgList, i.e., they both are not protecting the same SRLGs in the network.

In this example, there are two class of services considered—High Priority (HP) protect circuits 19 and Low priority (LP) protect circuits 19. This may allow protection differentiation for different services. The CAC module may maintain two lists—HP-ProtectedSrlgList and LP-ProtectedSrlgList. This is a set of ProtectedSrlgLists of all the HP protect and LP protect circuit 19 provisioned on that time slotl 3 respectively.

Each Bundled TE Connection 17 defines an OversubscriptionLimit for the protect bandwidth. It defines how many times the total BW on a bundled TE Connection 17 can be subscribed. Note that this limit is not on the individual TS 13 on connections 17 but on the overall bundled Connection 17 BW. There may be two types of protect bandwidth modeled, PhysicalProvProtTs and SubscribedProvProtTs. PhysicalProvProtTs is the provisioned protect TS 13 on the connection 17, without considering how many times each TS 13 is consumed. SubscribedProvProtTs is the total provisioned TS 13 on connection 17 considering the oversubscription on the PhysicalProvProtTs. For example, if in a connection 17 there are 10G provisioned with protect circuits 19 and each TS 13 is subscribed twice, the PhysicalProvProtTs=10 and SubscribedProvProtTs=20. The TS 13 taken by work circuit 18 is called, ProvisionedWorkTs. A circuit, work or protect, may not cross the component connection 17 boundary. All the TS 13 required by the circuit must be allocated from within a connection.

One exemplary partial process for allocation of time slots 13 will now be described with reference to FIGS. 2-4. This partial process involves three phases: (A) Component Selection Phase—FIG. 2, (B) Connection Admission Phase—FIG. 3, and (C) Optimization Phase—FIG. 4. Each of these phase has certain qualification criterion required before it could go to next phase, otherwise fails the CAC. Each phase and the criterion is explained in below section.

Component Selection Phase: When there are multiple connections available in a bundle Connection 17, the most preferable component that meets the demands of the Work and Protect service is selected. This phase works at bundled connection 17 level only and is applied for Work circuits as well as Protect circuits. Firstly, we ensure that we maximize the bandwidth sharing for protect circuits 19, i.e., already provisioned protect TS 13 will be preferred before consuming free TS 13. Secondly, the CAC module 20 also addresses fragmentation issue which could arise due to nature of sharing for work 18 and protect circuits 19. A TS 13 taken by a work circuit 18 cannot be shared by any other circuit, work or protect, while protect can be shared by only another protect circuit. And any given circuit cannot cross the boundary of a component. Some connections may be partially filled with work and protect circuits 19 randomly, leaving the free BW on a bundle connection 17 spread over its connections. This could avoid creation of a bigger capacity circuit in a component.

An example is shown in FIG. 5 that considers a Bundled TE Connection 17 of 5 connections 17 with each connection having a 100G capacity. Thus, the biggest service that can be created on a connection can be of 100G capacity. Each connection 17 can have a mix of 100G, 40G, and 10G services. The problem can be explained with reference to the example of FIG. 5 for a given BW distribution in the table on Bundled TE Connection 17 for a set of 5 connections in it. Each TS 13 is worth 1G.

In the distribution shown in FIG. 5, although a 200G BW is free for work circuits 18 (C1-C5), a 100G circuit cannot be created. Even for protect with sharing on existing protect connection, we cannot create a 100G protect circuit. If all the work was packed together in one connection and protect in another, the BW efficiency could be maximized, leaving freer BW or shareable BW in a connections to accommodate new and bigger circuits. To address the above mentioned two requirements, BW sharing and BW fragmentation avoidance, a preference order of connections in a bundled connection 17 for a new circuit is defined:

SORTING FUNCTIONS FOR PROTECT CIRCUIT 19
    FIRST: Max Physical-Prov-Prot-TS
    SECOND: Max Subscribed-Prov-Prot-TS
    THIRD: Mini Provisioned-Work-TS
SORTING FUNCTIONS FOR WORK CIRCUIT 18
    FIRST: Max Provisioned-Work-Time slots
    SECOND: Min Physical-Prov-Prot-TS
    THIRD: Min Subscribed-Prov-Prot-TS The order given here will align the protect circuits 19 and work circuits 18 together with other similar type of circuits, trying to avoid the mix. Using the above order, the list of connection is sorted. Each connection is evaluated for criterion (B) and (C) below, ordering from first to last in the list, until a connection qualifies all the criterion or otherwise time slot allocation is failed.

Figure 2:
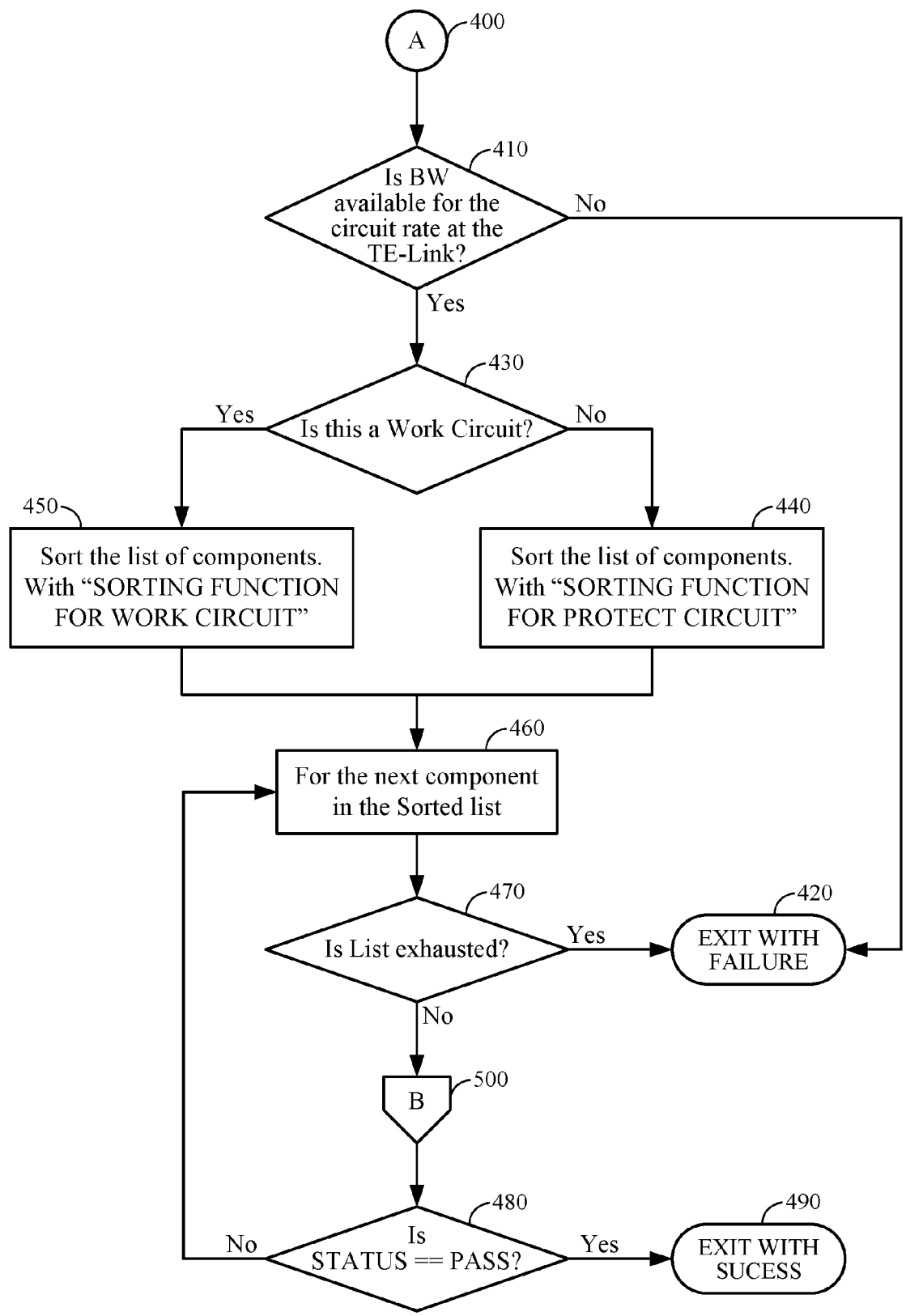
FIG. 2 illustrates a Component Selection Phase in accordance with some examples of the disclosure.

FIG. 2 describes the process involved in phase A 400. As shown, phase A 400 starts in block 410 where a determination is made whether enough BW is available for the circuit to be provisioned. If the answer is no, the process moves to block 420 where the process exits with a failure. If the answer is yes, the process moves to block 430. In block 430 a determination is made whether this is a work circuit 18. If this is a work circuit 18, the process moves to block 450, else the process moves to block 440. In block 450, the list of connections 17 is sorted with the sorting function above for work circuits 18 and the process moves to block 460. In block 440, the list of connections is sorted with the sorting function above for protect circuits 19 and the process moves to block 460. In block 460, the next connection 17 in the sorted list is selected and the process moves to block 470. In block 470, a determination is made whether the list of connections 17 has been exhausted. If yes, the process moves to block 420 and exits with a failure. If no, the process moves to block 500 and the process described in FIG. 3. Once the process of FIG. 3 is complete, the process will return to this point. Once the process returns to this point, the process moves to block 480 and a determination is made whether the status is pass (successful allocation). If yes, the process moves to block 490 and exits with a success. If no, the process moves back to block 460.

Connection admission phase: From the selected connection from the Phase A 400, we run the second phase B 500 on it. This criterion allocates the time slots for a work or protect circuit request. The number of time slots required may be determined by the rate of the circuit. In the application examples 10G, 40G and 100G rates will need 10, 40 and 100 TS 13 respectively, since each TS 13 represent 1G capacity. If Phase 'B' 500 fails to allocate a required TS 13, the process returns back to Phase 'A' 400. Phase B 500 applies at component connection 17 level only. This phase is applied for Work as well as Protect circuits. If it's a work circuit 18, check if the free TS 13 in the component connection 17 is enough to satisfy the demand. If yes, allocate the requested TS 13 from the available and return to Phase 'A' 400 with status SUCCESS, otherwise return with status FAILURE.

If it's a protect circuit, based of its class of service (COS), i.e., either HP or LP, apply different sharing criterion to find the list of qualified TS 13. A qualified TS 13 is the one which can be allocated for a requested protect circuit post applying a criterion. This criterion is called Fate Sharing Criterion. The Fate Sharing Criterion for HP and LP is governed by the following rules:

HP and LP connection can share the TS 13 on a connection 17 even if they are protecting the common SRLGs.
Two HP protect path protecting the same set of SRLGs will not share the TS 13
Two LP protect path protecting the same set of SRLGs will not share the TS 13
  FATE SHARING CRITERION FOR HP PROTECT 19
    Take all the provisioned TS 13 in the component connection 17
    Exclude the TS 13 with work circuit 18 provisioned on it
      Exclude the TS 13 with common items between circuits ProtectedSrlgList and TS 13's HP-ProtectedSrlgList
  FATE SHARING CRITERION FOR LP PROTECT 19
    Take all the provisioned TS 13 in the component connection 17
    Exclude the TS 13 with work circuit 18 provisioned on it.
      Exclude the TS 13 with common items between circuits ProtectedSrlgList and TS 13's LP-ProtectedSrlgList Then the Qualified TS 13+Free TS 13 should be enough to meet the requested TS 13, otherwise fail the connection and return to Phase 'A' 400 with FAILURE or move to Phase 'C' 600 for optimization of Qualified TS 13 to allocate whatever is required.

Figure 3:
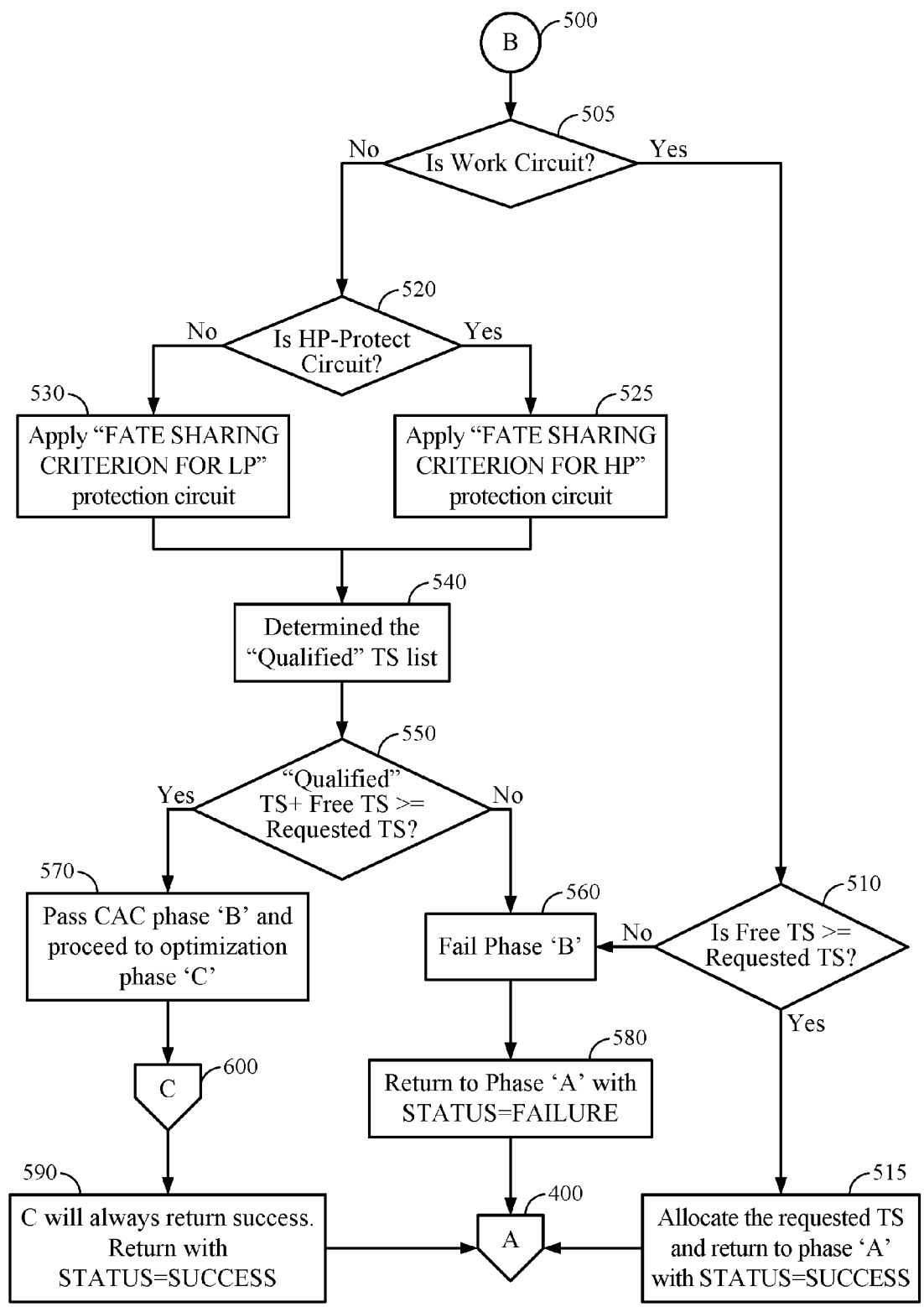
FIG. 3 illustrates a Connection Admission Phase in accordance with some examples of the disclosure.

FIG. 3 describes the processes involved in Phase B 500. As shown in FIG. 3, phase B 500 starts in block 505 where a determination is made whether this is a work circuit 18. If no, the process moves to block 520. If yes, the process moves to block 510 where a determination is made whether a free TS 13 greater than or equal to the requested TS 13. If the answer is no, the process moves to block 560 otherwise the process moves to block 515. In block 515, the requested TS 13 is allocated and the process returns to phase A 400 at the block 500 (point which we left the process in FIG. 2 instead of the beginning) with a success status. In block 520, a determination is made whether this is a HP protect circuit. If yes, the process moves to block 525. If no, the process moves to block 530. In block 525, the process applies the fate sharing criterion for HP protect circuits 19 and moves to block 540. In block 530, the process applies the fate sharing criterion for LP protect circuits 19 and moves to block 540. In block 540, the qualified TS 13 list (e.g. see FIG. 5) is determined and the process moves to block 550. In block 550, a determination is made whether the qualified TS 13 plus the free TS 13 is greater than or equal to the requested TS 13. If yes, the process moves to block 570. If no, the process moves to block 560. In block 570, the connection admission phase B is considered passed and the process proceeds to phase C 600 from which it will return to this departure point and proceed to block 590 with a status of success. Block 590 returns the process to phase A 400 to the point of departure before block 480. In block 560, the process is marked as failing phase B 500 and proceeds to block 580. In block 580, the status is marked as failure and the process returns to phase A 400 to the point of departure before block 480.

Optimization Phase: The third and last phase is to select the best set of time slots from the "QualifiedTs" list. This attempts to maximize bandwidth usage and allow considerations for multiple failure scenarios. The ordering of these optimization criteria may be important to satisfy requirements pertaining to bandwidth usage and multiple failure scenarios. This phase is applicable only for the protect circuit.

For a protect circuit type, apply an optimization criterion on qualified TS 13 from phase 'B' 500. As a result of optimization criterion, each TS 13 is assigned a weight value. Now all the QualifiedTS list is sorted based on their weight value and the required TS 13 are selected from first to last, along with free TS 13 on the connection if required.

Figure 4:
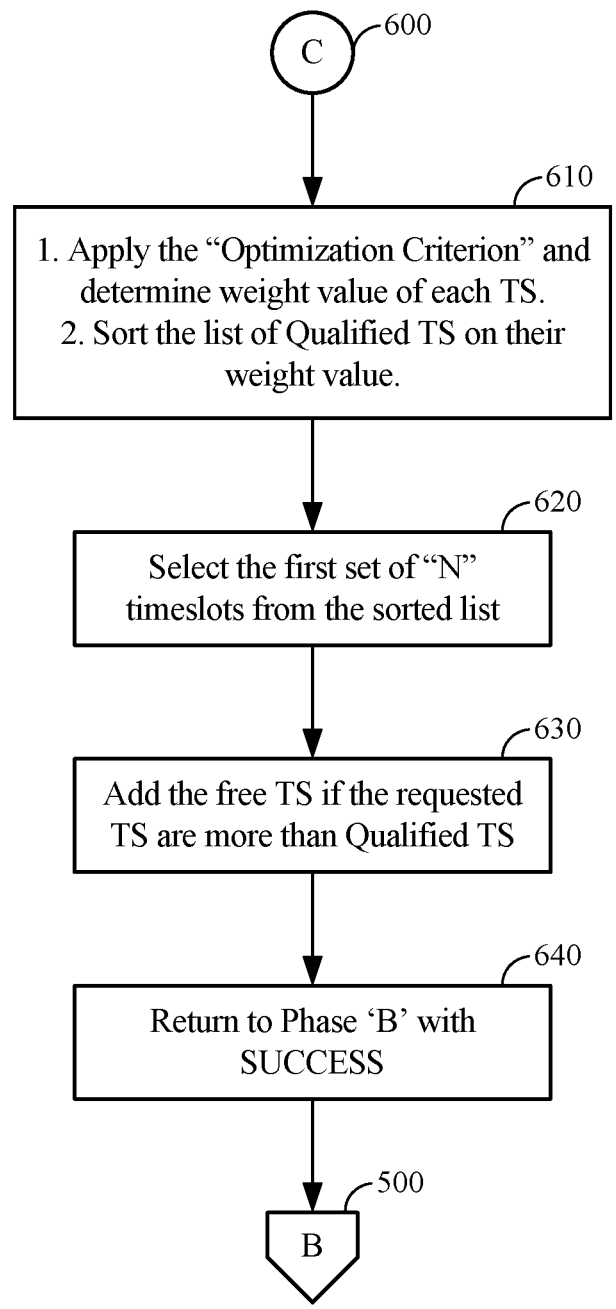
FIG. 4 illustrates an Optimization Phase in accordance with some examples of the disclosure.

FIG. 4 describes the process for the optimization phase. As shown in FIG. 4, phase C 600 begins with block 610. In block 610, the optimization criterion is applied to determine a weight value of each TS 13 and then the list of qualified TS 13 is sorted based on the assigned weight value. Next in block 620, the first set of N time slots are selected from the sorted list. Next in block 630, the free TS 13 is added if the requested TS 13 is more than the qualified TS 13. Next in block 640, the status is marked as success and the process returns to phase B 500 to the point of departure before block 590.

There could be multiple options possible for optimality based on different network operator protection requirements. Any one or combination of them can be applied in this phase. Following are the possible options:
  Number of SRLG protected on a TS 13
  Number of services impacted
  Amount of BW impacted Below is an explanation of the various optimization criterion and motivation for each option.

Number of SRLG protected on a TS 13: In this scheme, the Qualified TS 13 with bigger ProtectedSrlgList size is preferred. The idea is to maximise sharing, considering the fact that all the different SRLGs are not expected to fail together and hence can be shared. TS 13 Weight-Value={ProtectedSrlgList-Size on TS 13}. The count of SRLGs in the ProtectedSrlgList will be the weight of TS 13. This scheme may results in excessive stacking on each time slot, each will protect a large number of SRLG failures in the network. Thus, activation of one protect circuit due to one SRLG failure will block activation of other circuits due to failure of another SRLG in the network. To avoid this the CAC module should balance the oversubscription on each time slot in conjunction with number of SRLGs protected. This will normalize the distribution of SRLG in the provisioned TS 13. The advantage of this scheme is the bandwidth efficiency. It improves the protection BW sharing in the network and the network operator may provision more protect paths.

Number of services impacted: Here the weight of TS 13 is inverse to the number of services it impacts. TS 13 impacting less number of services has more weight. TS 13 Weight-Value={1/Oversubscription of TS 13}. For a TS 13, number of services created is same as the oversubscription count, and hence the oversubscription count gets balanced in this scheme. Choosing a set of TS 13 that impacts lesser number of services, at the time of protect circuit provisioning, will result in a TS 13 distribution that is better able to handle multiple failures. The collateral impact due to activation of a single circuit is minimized here, in terms of number of services.

Amount of BW impacted: Each time slot can be tagged with a weight that helps determine the amount of bandwidth that is impacted if the particular time slot is activated/preempted. This can be used to determine the number and size of services getting impacted and can be used in optimization. TS 13 Weight-Value={1/Sum of each provisioned circuit BW on TS 13}. The motivation for this criterion comes from the fact that if there are two TSs 13 in the qualified list, one has 100G and another 10G circuit provisioned on it. Since the cost of 100G connection is more, hence a new protect circuit should prefer the TS 13 with 10G circuit provisioned on it as compared to the one with 100G circuit provisioned on it. Thus, upon activation of a circuit, the total bandwidth impacted is lesser. Based on the customer or network operator preference, optimality criterion could use any one of the options or combination of options explained above. The sort will use the weight values defined above and sort the qualified TS 13 list.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
    determining, by a controller, an amount of unused time slots available for each of a plurality of connections connecting a first device to a second device, each of the plurality of connections carrying optical signals formatted as a plurality of time slots, the plurality of time slots constituting a time division multiplexed transmission and wherein the controller comprises a memory and a logic circuit configured to communicate with the first device, the second device, a third device, and a fourth device;
    determining, by the controller, if any of the plurality of time slots of the plurality of connections are being used as a first work circuit connecting the third device and the fourth device or reserved for use as a first protect circuit connecting the third device and the fourth device;
    sorting, by the controller, the plurality of connections based on an amount of used time slots of a respective one of the plurality of connections; and
    assigning, by the controller, at least one of the unused time slots of each of the plurality of connections to a time division multiplexed circuit connecting the first device to the second device based at least in part on the sorted plurality of connections.

2. The method of claim 1, wherein the plurality of connections are sorted based on whether the time division multiplexed circuit is a second work circuit or a second protect circuit.

3. The method of claim 2, wherein the sorting the plurality of connections comprises sorting the plurality of connections first on a maximum number of provisioned work time slots, second on a minimum number of physical provisioned protect time slots, and third on a minimum number of subscribed provisioned protect time slots.

4. The method of claim 2, wherein the sorting the plurality of connections comprises sorting the plurality of connections first on a maximum number of physical provisioned protect time slots, second on a maximum number of subscribed provisioned protect time slots, and third on a minimum number of provisioned work time slots.

5. The method of claim 1, further comprising:
    determining if the time division multiplexed circuit is a high priority circuit or a low priority circuit;
    wherein the assigned at least one of the unused time slots is not a work circuit provisioned time slot or a common time slot provisioned on both a protected shared circuit list and a protected high priority shared circuit list when the time division multiplexed circuit is the high priority circuit; and
    wherein the assigned at least one of the unused time slots is not a work circuit provisioned time slot or a common time slot provisioned on both the protected shared circuit list and a protected low priority shared circuit list when the time division multiplexed circuit is the low priority circuit.

6. The method of claim 2, further comprising determining if the assigned at least one of the unused time slots is not assigned to a provisioned protect circuit prior to assigning the assigned at least one of the unused time slots if the time division multiplexed circuit is the second protect circuit.

7. The method of claim 6, further comprising:
determining a weight for each of the unused time slots; and
sorting each of the unused time slots based on the respective weight;
wherein the assigning at least one of the unused time slots assigns the at least one of the unused time slots based on the respective weight.

8. The method of claim 7, wherein the weight is determined based on one of a number of protected time slots on a respective one of the plurality of connections with the unused time slot, a number of circuits provisioned on the respective one of the plurality of connections with the unused time slots, or an amount of bandwidth protected on the respective one of the plurality of connections with the unused time slots.

9. The method of claim 1, further comprising:
determining a weight for each of the unused time slots;
sorting each of the unused time slots based on the respective weight; and
wherein the assigning at least one of the unused time slots assigns the at least one of the unused time slots based on the respective weight.

10. The method of claim 9, wherein the weight is determined based on one of a number of protected time slots on a respective one of the plurality of connections with the unused time slots, a number of circuits provisioned on the respective one of the plurality of connections with the unused time slots, or an amount of bandwidth protected on the respective one of the plurality of connections with the unused time slots.

11. An apparatus comprising:
a controller comprising a memory and a logic circuit configured to communicate with a first device, a second device, a third device, and a fourth device and further configured to:
determine an amount of unused time slots available for each of a plurality of connections connecting the first device to the second device, each of the plurality of connections carrying optical signals formatted as a plurality of time slots, the plurality of time slots constituting a time division multiplexed transmission;
determine if any of the plurality of time slots of the plurality of connections are being used as a first work circuit connecting the third device and the fourth device or reserved for use as a first protect circuit connecting the third device and the fourth device;
sort the plurality of connections based on an amount of used time slots of a respective one of the plurality of connections; and
assign at least one of the unused time slots of each of the plurality of connections to a time division multiplexed circuit connecting the first device to the second device based at least in part on the sorted plurality of connections.

12. The apparatus of claim 11, wherein the plurality of connections are sorted based on whether the time division multiplexed circuit is a second work circuit or a second protect circuit.

13. The apparatus of claim 12, wherein the controller is further configured to sort the plurality of connections first on a maximum number of provisioned work time slots, second on a minimum number of physical provisioned protect time slots, and third on a minimum number of subscribed provisioned protect time slots.

14. The apparatus of claim 12, wherein the controller is further configured to sort the plurality of connections first on a maximum number of physical provisioned protect time slots, second on a maximum number of subscribed provisioned protect time slots, and third on a minimum number of provisioned work time slots.

15. The apparatus of claim 11, wherein the controller is further configured to: determine if the time division multiplexed circuit is a high priority circuit or a low priority circuit;
wherein the assigned at least one of the unused time slots is not a work circuit provisioned time slot or a common time slot provisioned on both a protected shared circuit list and a protected high priority shared circuit list when the time division multiplexed circuit is the high priority circuit; and
wherein the assigned at least one of the unused time slots is not a work circuit provisioned time slot or a common time slot provisioned on both the protected shared circuit list and a protected low priority shared circuit list when the time division multiplexed circuit is the low priority circuit.

16. The apparatus of claim 12, wherein the controller is further configured to:
determine if the assigned at least one of the unused time slots is not assigned to a provisioned protect circuit prior to assigning the assigned at least one of the unused time slots if the time division multiplexed circuit is the second protect circuit.

17. The apparatus of claim 16, wherein the controller is further configured to:
determine a weight for each of the unused time slots; and
sort each of the unused time slots based on the respective weight;
wherein the assigning at least one of the unused time slots assigns the at least one of the unused time slots based on the respective weight.

18. The apparatus of claim 17, wherein the weight is determined based on one of a number of protected time slots on a respective one of the plurality of connections with the unused time slots, a number of circuits provisioned on the respective one of the plurality of connections with the unused time slots, or an amount of bandwidth protected on the respective one of the plurality of connections with the unused time slots.

19. The apparatus of claim 11, wherein the controller is further configured to:
determine a weight for each of the unused time slots;
sort each of the unused time slots based on the respective weight; and
wherein the assigning at least one of the unused time slots assigns the at least one of the unused time slots based on the respective weight.

20. The apparatus of claim 19, wherein the weight is determined based on one of a number of protected time slots on a respective one of the plurality of connections with the unused time slots, a number of circuits provisioned on the respective one of the plurality of connections with the unused time slots, or an amount of bandwidth protected on the respective one of the plurality of connections with the unused time slots.

* * * * *